Aug. 20, 1968 W. KOBNICK 3,397,516
AIR FILTER FOR AIR BRAKE SYSTEMS
Filed Jan. 16, 1967
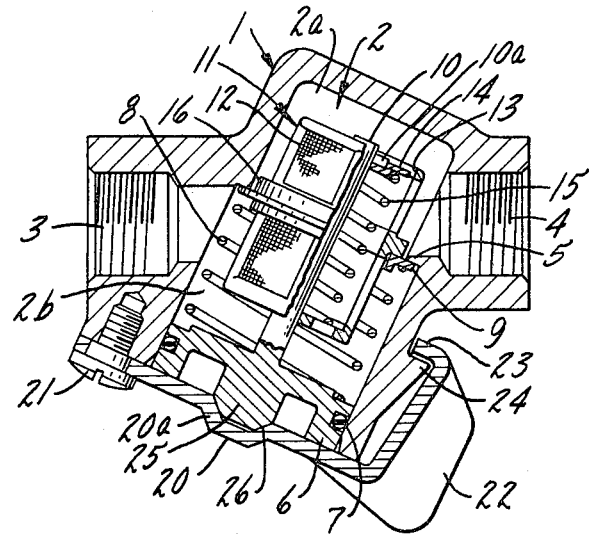
INVENTOR.
Werner Kobnick,
BY Parker & Carter
Attorneys.

United States Patent Office 3,397,516
Patented Aug. 20, 1968

3,397,516
AIR FILTER FOR AIR BRAKE SYSTEMS
Werner Kobnick, Heidelberg, Germany, assignor to Berg Mfg. & Sales Co., a corporation of Illinois
Filed Jan. 16, 1967, Ser. No. 609,391
3 Claims. (Cl. 55—313)

ABSTRACT OF THE DISCLOSURE

An air line filter assembly including a chamber, a piston like disc sealing one end of the chamber, a filter movable, in response to its clogging and resultant increase in chamber pressure, on the disc in the chamber in one direction to open a clear passage for air moving in one direction, the filter movable in the other direction to open a second clear passage for air moving in another direction. A pivoted cover for the chamber is locked closed by engagement with the disc when the disc is under chamber pressure, the engagement being manually overcome with absence of chamber pressure.

This invention relates to vehicle air brake systems and has partcular relation to an air filter for said systems.

One purpose of the invention is to provide an air filter effective to permit passage of air therethrough in either direction when the resistance of the filter element is increased by an accumulation of deleterious particles.

Another purpose is to provide an air filter having means automatically openable against spring resistance to create an air path in either direction through said filter when said filter is clogged with deleterious particles.

Another purpose is to provide an air filter assembly of maximum simplicity and ease of filter element replacement.

Another purpose is to provide an air filter having a filter element and by-pass means designed in cartridge form and removable from a filter housing as a unit with maximum ease and without the employment of tools.

Another purpose is to provide an air filter assembly having cover means easily removed in the absence of air pressure and including lock means responsive to air pressure to resist said removal.

Another purpose is to provide an air filter assembly having a piston element effective to support a filter element and valve means to seal the assembly against the escape of air pressure and to lock a housing closure against unintended opening when pressure is present in said assembly.

Other purposes will appear from time to time during the course of the specification and claims.

The invention is illustrated more or less diagrammatically in the accompanying drawing wherein the device of the invention is shown in partial cross section and with parts broken away.

Like parts are indicated by like numerals throughout the specification and drawing.

Referring now to the drawing, the numeral 1 generally designates a housing. The housing 1 defines a filter chamber 2 with the opposite sides of which ports 3 and 4 communicate. Between ports 3 and 4 an annular inwardly directed flange 5 is positioned at the juncture of smaller chamber portion 2a and larger chamber portion 2b.

A piston or disc element 6 is slidable in chamber portion 2b and carries a seal 7 in engagement with the inner surface of the wall defining chamber portion 2b. It will be observed that port 3 communicates with chamber portion 2b on one side of flange 5 and port 4 communicates with chamber portion 2a on the opposite side of flange 5. A spring 8 has one of its ends engaging piston 6 and its opposite end engaging a valve ring 9 to urge the latter against flange 5 within chamber portion 2b.

Piston 6 carries an axially, inwardly extending center post 10 on which a filter pot 11 is slidable. Post 10 extends through chamber portion 2b, ring 9, flange 5 and a substantial distance into chamber portion 2a. The pot 11 has a circumferential screen wall 12 occupying a large part of chamber portion 2b and extending through ring 9 to occupy part of chamber portion 2a and the pot 11 has an upper or outer open end 13. A pin 10a extends through a distal end portion of post 10 to restrain a spring retainer ring 14 positioned within and substantially filling the open end 13 of pot 11. A second spring 15 is positioned within pot 11 and has its opposite ends in engagement with the inner surface of ring 14 and the inner surface of the bottom wall of pot 11. The circumferential wall 12 of pot 11 carries an annular, outwardly extending valve flange 16 intermediate its ends and positioned for seating upon the ring 9 in response to the action of spring 15.

A cover 20 is pivoted across the otherwise open end of chamber portion 2b, the fastener element 21 serving to retain the cover on housing 1 and as a pivot point. Handle segment 22 of cover 20 is provided for manual operation and an end portion 23 overlies an ear 24 on housing 1 to assist in retaining the cover 20 in normal position on housing 1. The piston or disc 6 has an axial locking extension 25 having a frusto-conical end surface 26 seatable in a correspondingly shaped socket 20a of the cover 20 and urged thereinto by spring 8 and the pressure within chamber portion 2b.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

Air pressure delivered, for example, at port 3 flows into chamber portion 2b and through filter wall 12 into the portion of filter pot 11 within chamber 2b from whence the air flows outwardly through the filter pot portion within chamber 2b and thence outwardly through port 4. Similarly, air pressure flowing in the opposite direction, i.e., inwardly at port 4, flows through the filter pot portion within chamber portion 2a and outwardly through the filter port portion within chamber portion 2b and port 3.

With pressure in chamber 2, the lock means 25 engages the socket 20a in cover 20 and locks the cover 20 against pivoting upon its pivot 21 and thus against inadvertent opening with pressure in the housing of the filter assembly. In the absence of pressure within the chamber 2, the cover 20 may be easily rotated, the frusto-conical engagement of the surface 26 of lock post 25 and socket 20a permitting the same against the relatively light resistance of spring 8. With the cover 20 thus rotated out of its closing position, the entire filter cartridge assembly, consisting of elements 6 through 16, 25 and 26, can be easily removed from housing 1 as a unitary element, for cleaning or replacement.

Should the portion of filter pot 11 within chamber 2b become clogged with dirt or other deleterious particles, the pressure within chamber 2b will build and the entire filter pot 11 will be moved along post 10 away from piston 6, or to the upper right as the parts are shown in the drawing. Such movement of pot 11 produces an unseating of the valving flange 16 from the ring 9, against the action of spring 15, and thus opens a clear path through ring 9 for the air entering at port 3 to the port 4. Similarly, with air passing through the housing 1 in the opposite direction, i.e., from port 4 to port 3, the accumulation of deleterious material on the portion of the filter pot or element 11 within chamber portion 2a will produce an increase of pressure within chamber portion 2a sufficient to overcome the action of spring 8 and thus to produce a movement of pot 11 and valve flange 16 against ring 9 and a consequent unseating of ring 9 from flange 5 to open a clear path for the air entering at port 4 through flange 5 and chamber portion 2b to port 3.

There is claimed:

1. A filter assembly including a housing, said housing having a chamber, said chamber having an open end, a lock-member movable over said open end, said chamber open end constituting a constant diameter bore, an imperforate piston slidable in said bore and engageable with said member, said piston at all points having a diameter smaller than the diameter of said bore and said bore extending into said chamber a distance greater than the axial length of said piston, said lock-member and said piston having complementary means thereon which move the piston into said bore toward the center of said chamber as said lock-member is moved from closed to open and open to closed positions, said piston movable inwardly within said bore toward the center thereof in response to movement of said lock-member, means within said chamber urging said piston away from the center thereof and out of said bore, a pair of ports communicating with said chamber, a filter element carried in said chamber and between said ports by said piston, means within said chamber operatively associated with said filter element for constraining gas passing from one of said ports to the other of said ports to normally flow through said filter element whereby fluid flowing under pressure from one to another of said ports flows through said filter and urges said piston toward said member, and a dual set of poppet valves carried in said chamber and by said piston and filter element, one of said poppet valves, constructed and arranged to by-pass said filter element when the pressure upstream of said filter element exceeds the pressure downstream of said filter element by a predetermined amount and the other of said poppet valves being arranged to by-pass said filter element when the pressure downstream of said filter element exceeds the pressure upstream of said filter element by a predetermined amount; and locking formations on said piston and member defining said complementary means and wherein said member is rotatable on said housing, said formations including inclined opposing surfaces effective to move said piston inwardly in response to rotation of said member in the absence of fluid pressure in said housing.

2. The structure of claim 1 wherein said poppet valves comprise a valve seat formed in said chamber between said ports, a valve ring carried by said piston and yieldingly urged against said seat by a spring engaging said ring and said piston, and an outwardly extending annular valve flange carried by said filter element intermediate the ends of said filter element, said valve flange engaging said ring, a post carried by said piston, a retainer carried by said post and a second spring engaging said retainer and said filter element to urge said valve flange toward said valve ring.

3. The structure of claim 1 characterized by and including a valve seat between said ports, a valve ring, a first spring engaging said piston and one side of said ring to urge said ring against said seat, a valve flange carried by said filter element on the opposite side of said ring, a post secured to said piston and extending through said ring, a second spring engaging said post and said filter element to urge said filter toward said piston and said valve flange toward said ring and wherein said filter element extends through said ring and is movably carried on said post in one direction against the action of said second spring to unseat said flange from said ring to communicate said ports through said ring and said ring is movable in the opposite direction against the action of said first spring to communicate said ports through said seat.

References Cited

UNITED STATES PATENTS

| 687,384 | 11/1901 | Osbourn. | |
| 945,632 | 1/1910 | Strahl | 210—446 X |
| 1,869,589 | 8/1932 | Tischer | 55—313 |
| 1,899,030 | 2/1933 | Gruman | 55—417 X |
| 1,935,813 | 11/1933 | Neveu | 55—309 |
| 2,016,541 | 10/1935 | Campbell | 55—313 |
| 2,096,484 | 10/1937 | Farmer | 55—313 |
| 2,162,043 | 6/1939 | Westlund et al. | 55—379 X |
| 2,191,636 | 2/1940 | Walker. | |
| 2,320,725 | 6/1943 | Hautzenroeder | 210—451 |
| 2,334,486 | 3/1944 | Arvins et al. | 210—452 X |
| 2,349,416 | 5/1944 | Freeman. | |
| 2,633,244 | 3/1953 | Rood | 210—445 X |
| 2,840,183 | 6/1958 | George | 55—309 X |
| 2,962,119 | 11/1960 | White | 55—309 |
| 3,165,467 | 1/1965 | Klein et al. | 210—451 X |

FOREIGN PATENTS

| 372,606 | 3/1923 | Germany. |

HARRY B. THORNTON, *Primary Examiner.*

D. TALBERT, *Assistant Examiner.*